(12) United States Patent
Hannigan

(10) Patent No.: US 8,996,042 B1
(45) Date of Patent: Mar. 31, 2015

(54) SYSTEM AND METHOD FOR FORWARDING A PAGING MESSAGE BETWEEN ACCESS NODES

(71) Applicant: Sprint Spectrum LP, Overland Park, KS (US)

(72) Inventor: Michael K. Hannigan, Falls Church, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 246 days.

(21) Appl. No.: 13/684,022

(22) Filed: Nov. 21, 2012

(51) Int. Cl.
*H04W 68/00* (2009.01)
*H04W 68/04* (2009.01)

(52) U.S. Cl.
CPC .................................... *H04W 68/04* (2013.01)
USPC .......................................... 455/458; 455/515

(58) Field of Classification Search
CPC . H04W 68/025; H04W 68/02; H04W 76/023; H04W 4/14; H04W 92/22; H04W 68/00; H04W 68/12; H04W 68/005; H04W 76/025
USPC ................................................... 455/458, 515
See application file for complete search history.

(56) References Cited

U.S. PATENT DOCUMENTS

| 7,609,676 | B2 * | 10/2009 | Welnick et al. | 370/331 |
| 2009/0017797 | A1 * | 1/2009 | Li et al. | 455/414.1 |
| 2009/0017844 | A1 * | 1/2009 | Li et al. | 455/458 |
| 2009/0149185 | A1 | 6/2009 | Narasimha | |
| 2009/0298516 | A1 * | 12/2009 | Ryu et al. | 455/458 |
| 2011/0286465 | A1 * | 11/2011 | Koodli et al. | 370/401 |
| 2011/0306363 | A1 * | 12/2011 | Wang et al. | 455/456.1 |

* cited by examiner

*Primary Examiner* — Allahyar Kasraian

(57) ABSTRACT

A paging message is received at a first access node for a wireless device. It is determined by the first access node that the wireless device is unavailable at the first access node, and the paging message is forwarded from the first access node to a second access node over a communication link between the first access node and the second access node. A message can also be sent from the first access node to a controller node to prevent the sending of a second paging message from the controller node.

14 Claims, 5 Drawing Sheets

SYSTEM AND METHOD FOR FORWARDING A PAGING MESSAGE BETWEEN ACCESS NODES

TECHNICAL BACKGROUND

A wireless device can enter into a lower power state, such as an idle mode or a sleep mode, in which the wireless device is not in continuous communication with an access node. A communication system maintains a record of a recent location of the wireless device in an idle state in order to route paging messages to the wireless device if data is sent to the wireless device. One method of maintaining a record of a recent location of a wireless device is by use of a tracking area. A tracking area comprises a group of access nodes which are associated with a tracking area code. In addition, a tracking area list typically comprises a plurality of tracking areas which are adjacent or proximate to the tracking area. When a message such as data arrives for a wireless device in an idle mode, a first paging message can be sent from a network node to the access node most recently in communication with the wireless device. When the wireless device does not respond to the first paging message within a predetermined period of time, a second paging message can be sent from the network node to all of the access nodes in the tracking area, which can cause a substantial increase in system messaging. When the wireless device does not respond to the second paging message within a predetermined period of time, a third paging message can be sent from the network node to all of the access nodes in the tracking area list, which can cause another substantial increase in system messaging.

OVERVIEW

In an embodiment, a paging message is received at a first access node for a wireless device. It is determined by the first access node that the wireless device is unavailable at the first access node, and the paging message is forwarded from the first access node to a second access node over a communication link between the first access node and the second access node. In an embodiment, a message is sent from the first access node to a controller node to prevent the sending of a second paging message from the controller node.

DETAILED DESCRIPTION

Figure 1:
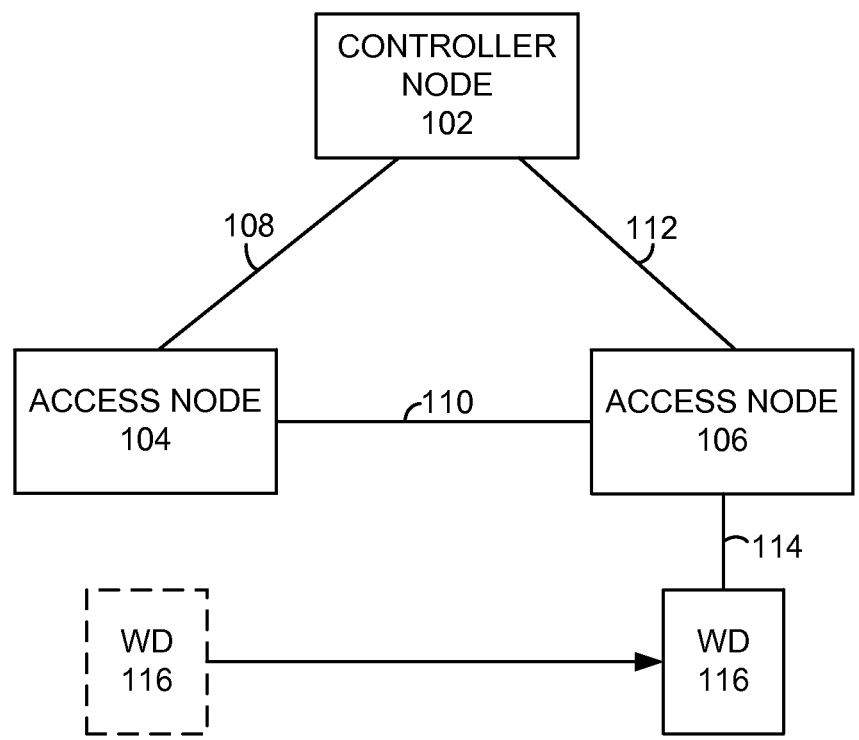
FIG. 1 illustrates an exemplary communication system for paging a wireless device.

FIG. 1 illustrates an exemplary communication system 100 to page a wireless device comprising controller node 102, first access node 104, second access node 106, and wireless device 116. Controller node 102 is a network element capable of, among other things, sending a paging message for a wireless device. Controller node 102 can comprise a processor and associated circuitry to execute or direct the execution of computer-readable instructions for sending a paging message. Controller node 102 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 102 can be for example, a standalone computing device or network element, such as a mobility management entity (MME), a gateway, a proxy node, or another network element, or the functionality of controller node 102 can be included in a network element capable of multiple functions.

Each of access nodes 104 and 106 is a network node capable of providing wireless communications to a wireless device, and can be, for example, a base transceiver station, a radio base station, an eNodeB device, or an enhanced eNodeB device. Access node 104 and controller node 102 can communicate over communication link 108, and access node 106 and controller node 102 can communicate over communication link 112. One example of communication links 108 and 112 is an S1 signaling link. Access nodes 104 and 106 can communicate with each other over communication link 110, one example of which is an X2 link.

Examples of wireless device 116 can include a cell phone, a smart phone, a computing platform such as a laptop, palmtop, or tablet, a personal digital assistant, an internet access device, or other device capable of wireless communication, including combinations thereof. Wireless device 116 can communicate with access node 106 over communication link 114. Wireless device was previously in communication with access node 104, and communication system 100 may maintain a record of the previous communication.

Communication links 108, 110, 112 and 114 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as additional access nodes, access node controllers, gateways, mobile switching centers, dispatch application processors, and location registers such as a home location register or visitor location register. Furthermore, other network elements may be present to facilitate communication between controller node 102, access node 104 and access node 106 which are omitted for clarity, including additional processing nodes, routers, gateways, and physical and/or wireless data links for carrying data among the various network elements.

In an embodiment, first access node 104 receives a paging message for wireless device 116, and first access node 104 determines that wireless device 116 is unavailable at first access node 104. The paging message can be received from controller node 102, or it can be received from another network element. First access node 104 forwards the paging message to second access node 106 over communication link 110 between access nodes 104 and 106. In an embodiment, first access node 104 sends a message to controller node 102 to prevent the sending of a second paging message from the controller node. In an embodiment, second access node 106 sends a message to controller node 102 to prevent the sending of a second paging message from the controller node. In an embodiment, second access node 106 is a plurality of second access nodes each in communication with the first access node over a communication link between the first access node and each of the plurality of second access nodes.

Figure 2:
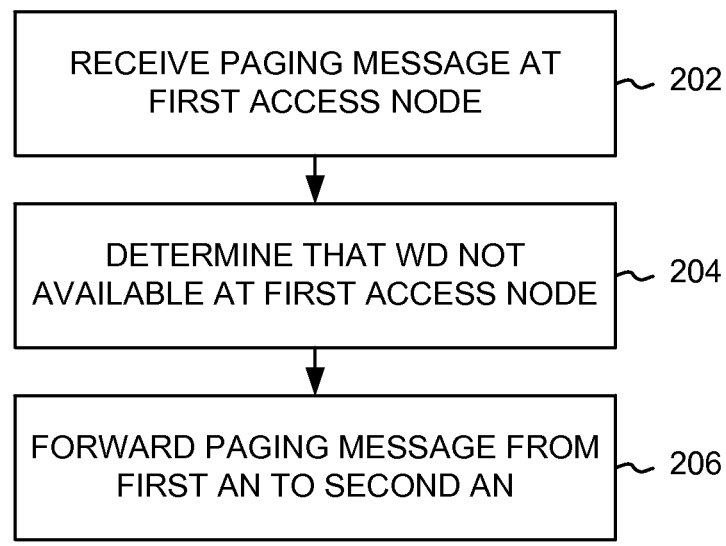
FIG. 2 illustrates an exemplary method of paging a wireless device.

FIG. 2 illustrates an exemplary method of paging a wireless device. A wireless device, such as wireless device 116, can enter into a lower power state, such as an idle mode or a sleep mode, in which wireless device 116 is not in continuous communication with access node 104. Nevertheless, communication system 100 maintains a record of a recent location of wireless device 116 in order to route paging messages to the wireless device, for example, if data or a call request is received for the wireless device. In an embodiment, communication network 100 maintains a record of the access node that wireless device 116 communicated with most recently, for example, access node 104.

In operation 202, a paging message for a wireless device is received at a first access node. For example, a paging message can be received at first access node 104 for wireless device 116. The paging message can be received from controller node 102, or it can be received from another network element.

In operation 204, the first access node determines that the wireless device is not available at the first access node. For example, access node 104 can determine that wireless device 116 is not available at access node 104. In an embodiment, when access node 104 receives the paging message for wireless device 116, access node 104 can transmit a paging message for wireless device 116 to a coverage area of the access node. Access node 104 can wait for a response from wireless device 116, for example, for a predetermined period of time. When access node 104 does not receive a response from wireless device 116 within the predetermined period of time, access node 104 can determine that wireless device 116 is not available at access node 104.

In operation 206, when the access node determines that the wireless device is not available at the first access node, the first access node forwards the paging message to a second access node over a communication link between the first access node and the second access node. For example, access node 104 can forward the received paging message (or another paging message) to access node 106 over communication link 110. In an embodiment, access node 106 is selected because it its coverage area is proximate or adjacent to a coverage area of access node 104, and when wireless device 116 is not available at access node 104 (the last access node in communication with wireless device 116). In an embodiment, the paging message is forwarded from first access node 104 to second access node 106 without the involvement of an intervening network node. For example, communication link 110 can be an X2 link between access nodes 104 and 106, which permits communication directly between access nodes 104 and 106.

Figure 3:
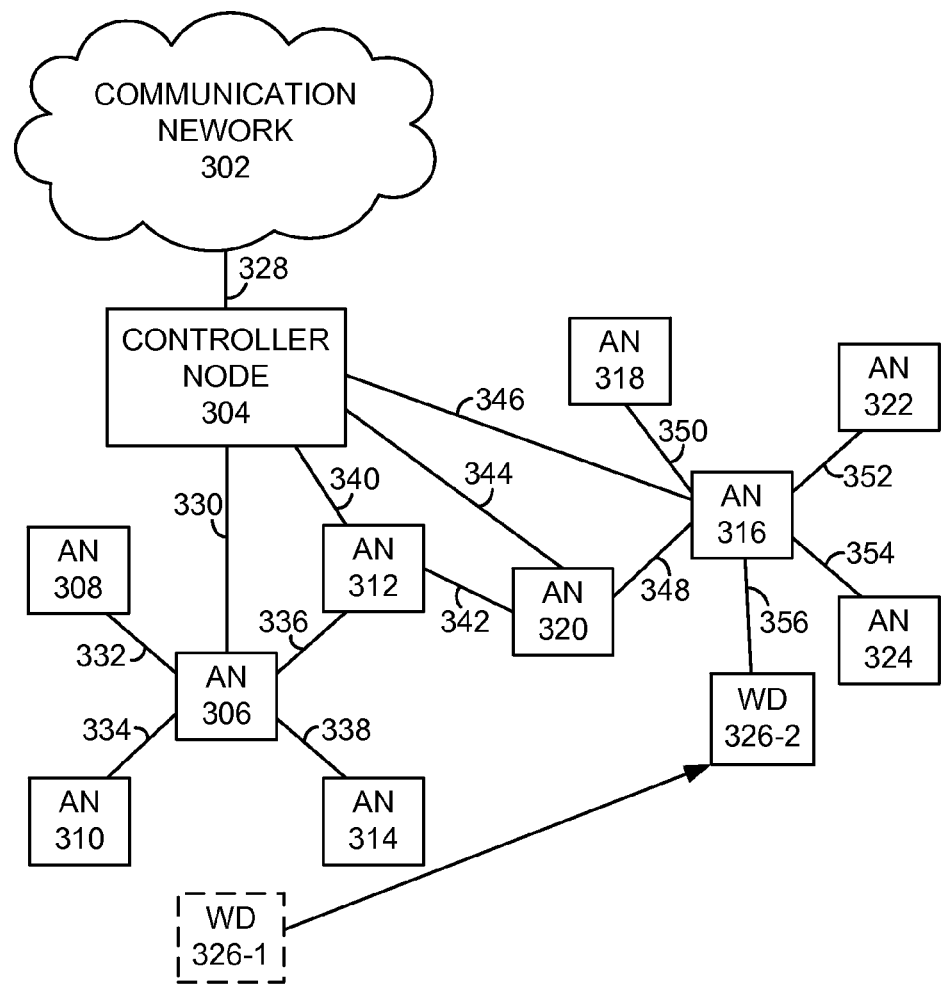
FIG. 3 illustrates another exemplary communication system for paging a wireless device.

FIG. 3 illustrates another exemplary communication system 300 for paging a wireless device comprising communication network 302, controller node 304, access nodes 306-324, and wireless device 326.

Communication network 302 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 302 may also comprise a wireless network, including base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 302 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 302 may also comprise a wireless network, including base stations, wireless communication nodes, telephony switches, internet routers, network gateways, computer systems, communication links, or some other type of communication equipment, and combinations thereof.

Controller node 304 is a network element capable of, among other things, sending a paging message for a wireless device. Controller node 304 can comprise a processor and associated circuitry to execute or direct the execution of computer-readable instructions for sending a paging message. Controller node 304 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 304 can be for example, a standalone computing device or network element, such as a mobility management entity (MME), a gateway, a proxy node, or another network element, or the functionality of controller node 304 can be included in a network element capable of multiple functions.

Each of access nodes 306-324 is a network node capable of providing wireless communications to a wireless device, and can be, for example, a base transceiver station, a radio base station, an eNodeB device, or an enhanced eNodeB device. Access nodes 306, 312, 316, 320 and controller node 302 can communicate over communication links 330, 340, 344 and 346, respectively. Communication links can also be present between other access nodes and controller node 304, but are omitted from FIG. 3 for clarity. An example of the communication links between access nodes and controller node 304 is an S1 signaling link.

Access nodes can also communicate with each other over communication links. Access nodes 306, 308, 310, 312, and 314 can communicate over communication links 332, 334, 336 and 338, respectively. Access node 312 can communicate with access node 320 over communication link 342. Access nodes 316, 318, 320, 322 and 324 can communicate over communication links 348, 350, 352 and 354, respectively. Additional communication links among access nodes can also be present, but are omitted from FIG. 3 for clarity. An example of the communication links between access nodes is an X2 link.

Examples of wireless device 326 can include a cell phone, a smart phone, a computing platform such as a laptop, palmtop, or tablet, a personal digital assistant, an internet access device, or other device capable of wireless communication, including combinations thereof. Wireless device 326 can communicate with access node 316 over communication link 356 (illustrated as reference number 326-2). Wireless device 326 was previously in communication with access node 306

(illustrated as reference number 326-1). Communication system 300 may maintain a record of the previous communication.

Communication links 328, 330, 332, 334, 336, 338, 340, 342, 344, 346, 348, 350, 352, 354 and 356 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between communication network 302, controller node 304, and access nodes 306-324 which are omitted for clarity, including additional processing nodes, routers, gateways, and physical and/or wireless data links for carrying data among the various network elements.

Figure 4:
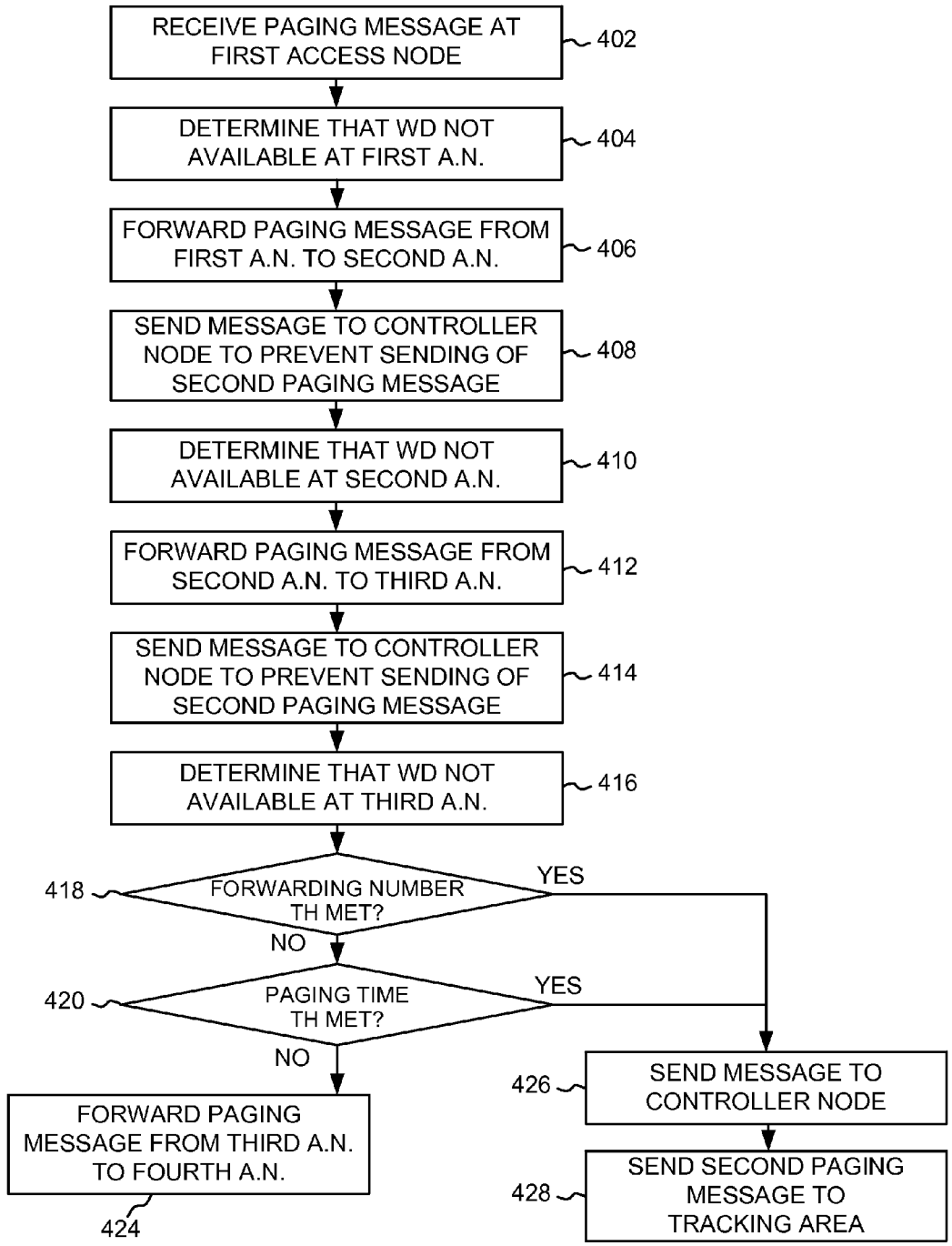
FIG. 4 illustrates another exemplary method of paging a wireless device.

FIG. 4 illustrates another exemplary method of paging a wireless device. In operation 402, a paging message for a wireless device is received at a first access node. For example, a paging message can be received at first access node 306 for wireless device 326. The paging message can be received from controller node 304, or it can be received from another network element. The paging message can be sent to access node 306 based on a record of a previous communication session between access node 306 and wireless device 326.

In operation 404, it is determined that the wireless device is not available at the first access node. For example, access node 306 can determine that wireless device 326 is not available at access node 306. In an embodiment, when access node 306 receives the paging message for wireless device 326, access node 306 can transmit a paging message for wireless device 326 to a coverage area of the access node. Access node 306 can wait for a response from wireless device 326, for example, for a predetermined period of time. When access node 306 does not receive a response from wireless device 326 within the predetermined period of time, it can be determined that wireless device 326 is not available at access node 306.

In operation 406, when it is determined that the wireless device is not available at the first access node, the first access node forwards the paging message to a second access node over a communication link between the first access node and the second access node. For example, access node 306 can forward the received paging message (or another paging message) to access node 312 over communication link 336. In an embodiment, access node 312 is selected because its coverage area is proximate or adjacent to a coverage area of access node 306. In an embodiment, the paging message is forwarded from first access node 306 to second access node 312 without the involvement of an intervening network node. For example, communication link 336 can be an X2 link between access nodes 306 and 312.

In operation 408, the first access node can send a message to the controller node to prevent the sending of a second paging message to the second access node. For example, access node 306 can send a message to controller node 304 indicating that access node 306 has forwarded the paging message to access node 312 to prevent controller node 304 from sending a second paging message to access node 312, or to another access node.

In operation 410, it is determined that the wireless device is not available at the second access node. For example, access node 312 can determine that wireless device 326 is not available at access node 312. In an embodiment, when access node 312 receives the paging message for wireless device 326, access node 312 can transmit a paging message for wireless device 326 to a coverage area of the access node, and access node 312 can wait for a response from wireless device 326, for example, for a predetermined period of time. When access node 312 does not receive a response from wireless device 326 within the predetermined period of time, it can be determined that wireless device 326 is not available at access node 312.

In operation 412, when it is determined that the wireless device is not available at the second access node, the second access node forwards the paging message to a third access node over a communication link between the second access node and the third access node. For example, access node 312 can forward the received paging message (or another paging message) to access node 320 over communication link 342. In an embodiment, access node 320 is selected because its coverage area is proximate or adjacent to a coverage area of access node 312. In an embodiment, the paging message is forwarded from second access node 312 to third access node 320 without the involvement of an intervening network node. For example, communication link 342 can be an X2 link between access nodes 312 and 320.

In operation 414, the second access node can send a message to the controller node to prevent the sending of a second paging message to the third access node. For example, access node 312 can send a message to controller node 304 indicating that access node 312 has forwarded the paging message to access node 320 to prevent controller node 304 from sending a second paging message to access node 320, or to another access node. Alternatively or additionally, access node 320 can send a message to controller node 304 to prevent controller node 304 from sending a second paging message to access node 320, or to another access node.

In operation 416, it is determined that the wireless device is not available at the third access node. For example, similar to access nodes 306 and 312, access node 320 can determine that wireless device 326 is not available at access node 320. In an embodiment, when access node 320 receives the paging message for wireless device 326, access node 320 can transmit a paging message for wireless device 326 to a coverage area of the access node, and access node 320 can wait for a response from wireless device 326, for example, for a predetermined period of time. When access node 320 does not receive a response from wireless device 326 within the predetermined period of time, it can be determined that wireless device 326 is not available at access node 320.

When it is determined that the wireless device is not available at the third access node, additional determinations can be made. In operation 418, it is determined whether a number of forwarded paging messages meets a forwarding number threshold. When the forwarding number threshold is met (operation 418-YES), a message is sent to controller node 304 (operation 426), and controller node 304 sends a second paging message to a tracking area comprising a plurality of access nodes (operation 428). For example, when a number of forwarded paging messages meets the forwarding number threshold, a message can be sent to controller node 304, and controller node 304 can send a second paging message to a tracking area comprising access nodes 306-324 to attempt to reach wireless device 326.

When a number of forwarded paging messages does not meet the forwarding number threshold (operation 418-NO), it is determined whether a period of time since the paging message was received at first access node 306 meets a paging time threshold (operation 420). When the paging time threshold is met (operation 420-YES), a message is sent to controller node 304 (operation 426), and controller node 304 sends a second paging message to a tracking area comprising a plurality of access nodes (operation 428). The tracking area can comprise, for example, access nodes 306-324.

When the period of time since the paging message was received at the first access node does not meet the paging time threshold (operation 420-NO), the third access node forwards the paging message (or sends another paging message) to a fourth access node. For example, third access node 320 can forward the paging message to fourth access node 316 over communication link 348. Access node 316 can then determine whether wireless device 326 is available at access node 316.

Figure 5:
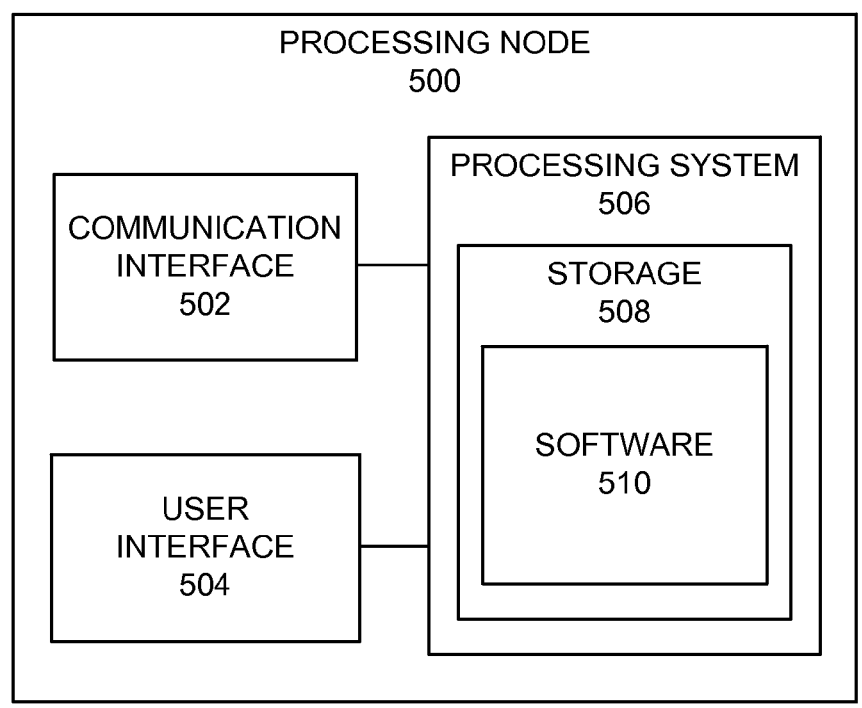
FIG. 5 illustrates an exemplary processing node.

FIG. 5 illustrates an exemplary processing node comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

An example of processing node 500 includes controller node 102 and controller node 304. Processing node 500 can also be an adjunct or component of a network element, such as an element of a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of paging a wireless device, comprising:
receiving a first paging message for a wireless device at a first access node, wherein the first access node determines that the wireless device is unavailable at the first access node and forwards the first paging message to at least one access node in a group of adjacent access nodes;
forwarding the first paging message from the at least one access node in the group of adjacent access nodes to one or more adjacent access nodes in a subsequent group of adjacent access nodes if:
the group of adjacent access nodes determines that the wireless device is unavailable at the at least one access node in the group of adjacent access nodes;
a number of forwards of the first paging message does not meet a forwarding number threshold; and,
a time interval for forwarding the first paging message does not meet a paging time threshold; and,
discontinuing the first paging message when the first paging message meets either the forwarding number threshold or the paging time threshold and sending a second paging message from a controller node to a tracking area.

2. The method of claim 1, further comprising:
sending a message from the first access node to the controller node to prevent the sending of the second paging message from the controller node.

3. The method of claim 1, wherein each access node in the group of adjacent access nodes is in communication with the first access node over a communication link.

4. The method of claim 1, further comprising:
sending a message from the at least one access node in the group of adjacent access nodes to the controller node to prevent the sending of the second paging message from the controller node.

5. The method of claim 1, wherein
the time interval for forwarding the first paging message is an elapsed period of time from receiving the first paging message at the first access node for the wireless device and a predetermined paging time threshold.

6. The method of claim 1, further comprising:
sending a message from the at least one access node in the group of adjacent access nodes to the controller node when the number of forwards of the first paging message meets the forwarding number threshold.

7. The method of claim 1, further comprising:
sending a message from the at least one access node in the group of adjacent access nodes to the controller node when the time interval for forwarding the first paging message meets the paging time threshold.

8. A system for paging a wireless device, comprising:
a first access node configured to:
- receive a first paging message for a wireless device;
- determine availability of the wireless device at the first access node; and,
- forward the first paging message to at least one access node in an adjacent group of access nodes when the wireless device is unavailable at the first access node;

the at least one access node in the adjacent group of access nodes configured to:
- determine availability of the wireless device at the at least one access node; and,
- forward the first paging message to one or more adjacent access nodes in a subsequent group of access nodes if:
  - the wireless device is unavailable at the at least one access node in the first group of adjacent access nodes;
  - a number of forwards of the first paging message does not meet a forwarding number threshold; and
  - a time interval for forwarding the first paging message does not meet a paging time threshold; and, a controller node configured to:
- discontinue the first paging message and send a second paging message to a tracking area when the first paging message meets either the forwarding number threshold or the paging time threshold.

9. The system of claim 8, further comprising:
the controller node, configured to send the first paging message, and to receive a message from the first access node to prevent the sending of the second paging message from the controller node.

10. The system of claim 8, wherein each access node in the group of adjacent access nodes is in communication with the first access node over a communication link.

11. The system of claim 8, wherein the at least one access node in the group of adjacent access nodes is further configured to send a message to the controller node to prevent the sending of the second paging message from the controller node.

12. The system of claim 8, wherein the time interval for forwarding the first paging message is an elapsed period of time from receiving the first paging message at the first access node for the wireless device and a predetermined paging time threshold.

13. The system of claim 8, wherein the at least one access node in the group of adjacent access nodes is further configured to send a message to the controller node when the number of forwards of the first paging message meets the forwarding number threshold.

14. The system of claim 8, wherein at least one access node in the group of adjacent access nodes is further configured to send a message to the controller node when the time interval for forwarding the first paging message meets the paging time threshold.

* * * * *